United States Patent
Mullersman et al.

[15] 3,665,285
[45] May 23, 1972

[54] POLARITY-MATED RECHARGEABLE BATTERY AND CHARGING UNIT

[72] Inventors: Ferdinand H. Mullersman; Robert E. Rockey, both of Gainesville, Fla.

[73] Assignee: General Electric Company

[22] Filed: May 27, 1970

[21] Appl. No.: 41,002

[52] U.S. Cl. ..................................320/2, 320/25, 339/184
[51] Int. Cl. .........................................H01m 45/04
[58] Field of Search..............................320/2, 25, 26, 46, 52; 339/185; 312/111, 223; D26/15.2

[56] References Cited

UNITED STATES PATENTS

| | | | |
|---|---|---|---|
| 3,194,689 | 7/1965 | Deschamps | 320/2 X |
| 3,287,076 | 11/1966 | Spofford | 320/2 X |
| 3,058,046 | 10/1962 | Anderson et al. | 320/46 X |
| 3,536,981 | 10/1970 | Locke et al. | 320/2 |
| 3,389,323 | 6/1968 | Jepson et al. | 320/25 X |
| 3,274,477 | 9/1966 | Boyes | 320/2 X |
| 3,102,222 | 8/1963 | Harmer | 320/46 X |
| 3,293,528 | 12/1966 | Rosen et al. | 320/2 |
| 2,982,849 | 5/1961 | Volkering et al. | 320/2 X |

FOREIGN PATENTS OR APPLICATIONS 222,200   7/1962   Austria ...............................339/185

Primary Examiner—J. D. Miller
Assistant Examiner—Robert J. Hickey
Attorney—Nathan J. Cornfeld, John P. Taylor, Nathan M. Briskin, Frank L. Neuhauser, Oscar B. Waddell and Joseph B. Forman

[57] ABSTRACT

A novel charging system is disclosed wherein a battery pack and a battery charger are interconnected to provide predetermined desired charging rates to the cells in the battery pack. A plurality of means carried by the pack and the charger cooperate to allow insertion of the pack into the charger in only one way thus assuring proper polarity.

4 Claims, 5 Drawing Figures

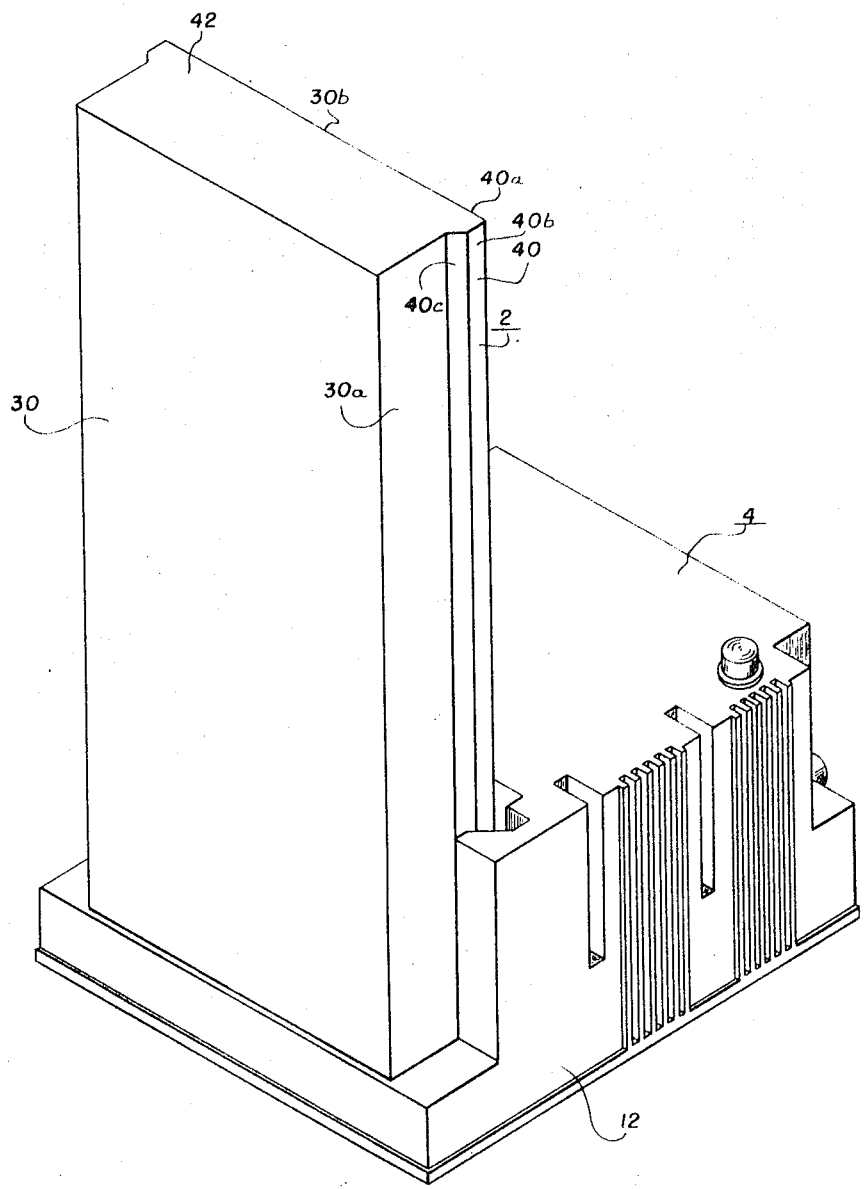

INVENTOR.
FERDINAND H. MULLERSMAN
ROBERT E. ROCKEY
BY John R. Taylor
THEIR ATTORNEY INVENTOR.
FERDINAND H. MULLERSMAN
ROBERT E. ROCKEY
BY John R. Taylor
THEIR ATTORNEY

POLARITY-MATED RECHARGEABLE BATTERY AND CHARGING UNIT

BACKGROUND OF THE INVENTION

This invention relates to rechargeable batteries, and more particularly, to a system for charging rechargeable batteries. In a particular aspect, the invention relates to means for interconnecting a battery charger with a battery pack comprising rechargeable batteries.

The availability of sealed, rechargeable batteries has resulted in the emergence of many battery operated devices such as battery operated appliances, toys, and other devices. Naturally, for such devices to be useful for their intended purpose, means must be provided for recharging the batteries. The recharging of the batteries is done by the consuming public who are not necessarily skilled in the electrical art. Hence, the interconnection of the rechargeable battery into a charger with the proper polarity of connection can be a problem to the unskilled layman. Inadvertent connection of the battery to the battery charger with improper polarity can result in damage to the battery. This problem is complicated in instances when the batteries are arranged in a multiple battery pack for use with a device requiring somewhat high voltage, for example, a 9 cell pack delivering about 10.8 volts. Since the batteries are expensive, insertion of a multiple battery pack into a battery charger with improper polarity can be a very expensive mistake for the consumer.

It is, therefore, an object of the invention to provide a system for charging rechargeable batteries wherein a battery pack comprising a plurality of rechargeable batteries in a common casing are connected to a battery charger by interconnecting means which insure proper polarity of the connections. It is another object of the invention to provide means which inhibit insertion of a battery pack improperly into a battery charger. It is yet another object of the invention to provide means which prevent the electrical interconnection of the battery pack with the battery charger when insertion has been made improperly. It is another object of the invention to provide an improved system for charging a battery pack comprising rechargeable batteries including an improved battery charger which combines with means within the battery pack to provide a plurality of charging rates for charging the batteries.

These and other objects of the invention will become apparent from a reading of the specification and drawing.

BRIEF DESCRIPTION OF THE DRAWINGS

FIG. 1 is an isometric view of a battery pack and charger in accordance with the invention.

DESCRIPTION OF THE PREFERRED EMBODIMENT

Figure 4:
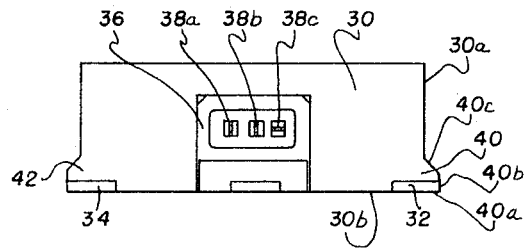
FIG. 4 is a top view of the battery pack.

Turning now to the drawings, the invention, as illustrated in FIG. 1, comprises a battery pack, generally indicated at 2, inserted into a battery charger generally indicated at 4. Battery pack 2 comprises a generally rectangularly shaped insulating case 30 which preferably is formed of a suitable high-impact resistant plastic material. Charger 4 comprises a case 12 of insulating material mounted to a metallic base member 14. Metallic base or chassis 14 (shown in FIG. 2) carries the electrical components of the charger to be described hereinbelow and as shown schematically in FIG. 5.

Figure 3:
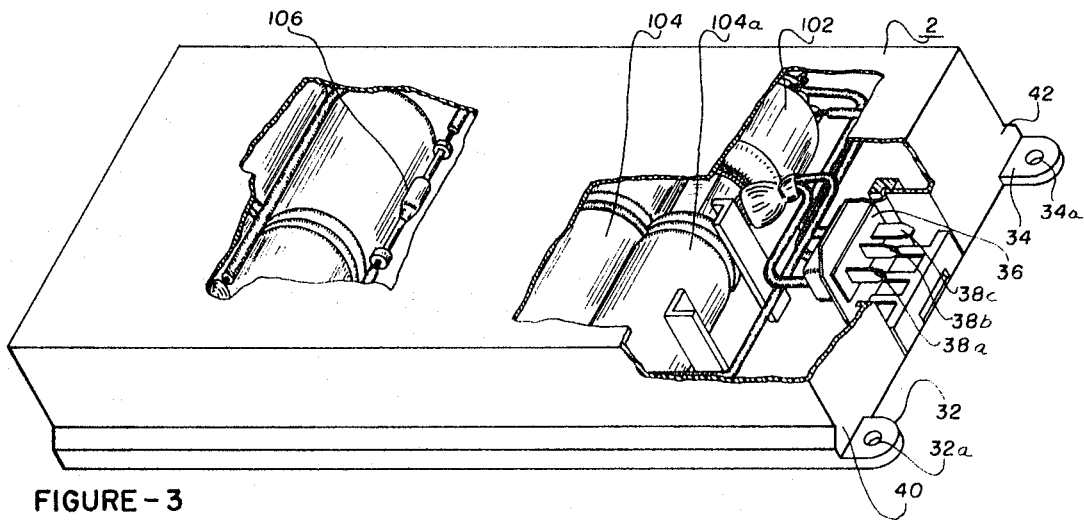
FIG. 3 is a partially cutaway view of the battery pack.

Battery pack 2, as shown in FIGS. 3 and 4, comprises an elongated generally rectangular casing 30 which houses a plurality of rechargeable batteries. In a preferred embodiment, battery pack 2 may contain as many as nine rechargeable nickel-cadmium cells, for example, the cells being connected in series to provide an output voltage of, say 10 to 11 volts. Battery pack 2 is provided with a pair of tabs or lugs 32 and 34 that may be integrally formed with the case 30 at one end thereof. A recessed plug 36 is also provided on the same end or side of casing 30. In the illustrated embodiment, plug 36 comprises three relatively flat metallic prongs or blades 38a, 38b, and 38c. The prongs or blades 38a, 38b, and 38c are generally arranged in a line with one of the outer blades, say blade 38c oriented with its flat face 90° to the other two blades. Plug 36 is recessed within casing 30 to a distance equal to or slightly in excess of the length of blades 38.

Casing 30 of battery pack 2 is also provided with a pair of ribs 40 and 42 longitudinally positioned along two opposite sides of casing 30. Ribs 40 and 42 conform geometrically to matching recesses or grooves in charger 4 as will presently be described. Rib 40, in the illustrated embodiment, has a first portion indicated as 40a which is at a 90° angle to sidewall 30a of casing 30 terminating in an outer surface 40b parallel to sidewall 30a and a third surface 40c tapered at a predetermined angle, say a 45° angle to sidewall 30a of casing 30. In the illustrated embodiment portion 40a is actually an extension of the rear wall 30b of casing 30. As can be seen from the drawings, rib 42 is shaped similarly to rib 40.

Figure 2:
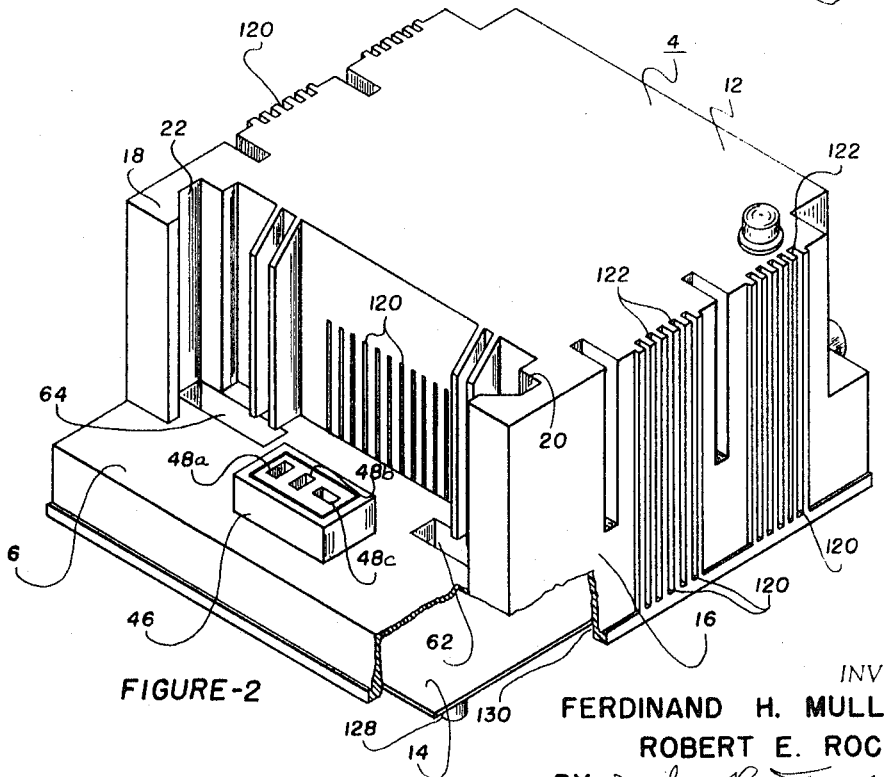
FIG. 2 is a partially cutaway isometric view of the charger.

Battery charger 4, as best seen in FIG. 2, is provided on one side with two upstanding arms 16 and 18, each respectively having longitudinally extending grooves 20 and 22 formed therein, substantially conforming respectively to ribs 40 and 42 on battery pack 2. Between arms 16 and 18 a female receptacle is mounted to a raised platform or base of the charger. Female socket 46 is raised from a base 6 of charger 4 a distance approximately equal to the recession of male plug 36 in casing 30. Female socket 46 is provided with a plurality of rectangular openings 48a, 48b, and 48c to receive blades 38a, 38b, and 38c on male plug 36. As can be seen from FIG. 2, two of the three openings, 48a and 48b are parallel to one another and the third opening, 48c is rotated 90° to conform to the positioning of blades 38a, 38b, and 38c on male plug 36. The recess comprising male plug 36 is rectangular having two opposite sides having a longer length than their adjacent sides. Thus, raised female socket 46 will only fit into the recess one of two ways. The spacial arrangement of blades 38a, 38b, and 38c on plug 36 and the corresponding openings in female socket 46 limits the insertion to only one proper way. Thus, if battery pack 2 is rotated 180° and insertion attempted, the blades on male plug 36 would not fit into the openings in female socket 46.

The floor or base member 6 on battery charger 4 is also provided with a pair of rectangular openings or recesses 62 and 64. Recesses 62 and 64 are spacially located and of sufficient depth to receive lugs 32 and 34 which protrude from battery pack 2. In the illustrated embodiment, lugs 32 and 34 are each provided with an opening 32a and 34a enabling lugs 32 and 34 to serve a further purpose of being used to connect a sling (not shown) to pack 2 enabling the user to more easily carry battery pack 2 for portable use such as in connection with a flash gun for a camera. When battery pack 2 is to be recharged, preferably the sling is removed. Lugs 32 and 34 then cooperate with recesses 62 and 64 to provide additional protection against improper insertion of the battery pack into charger 4. If insertion is attempted in any other manner lugs 32 and 34 will contact base 6 of charger 4 preventing the interconnecting of plug 36 into socket 46. In addition after proper insertion of battery pack 2 into charger 4, lugs 32 and 34 cooperate with openings or slots 62 and 64 respectively to maintain battery pack 2 in the proper position, thus relieving any possible mechanical strain between plug 36 and socket 46.

To insert battery pack 2 into battery charger 4, battery pack 2 is first oriented properly with lugs 32 and 34 facing the opening in the charger and then ribs 40 and 42 on the battery pack are inserted respectively into matching grooves 20 and 22 on arms 16 and 18 of charger 4 and the battery pack is then slid down these grooves until plug 36 and socket 46 are brought together and lugs 32 and 34 are received in their respective openings 62 and 64 of base 6. Thus, it is practically impossible to insert battery pack 2 into battery charger 4 in an improper manner. Even should rib 40 or rib 42 become damaged or break off, lugs 32 and 34 will prevent male plug 36 and female socket 46 from coming into contact unless battery pack 2 is inserted properly into charger 4.

Figure 5:
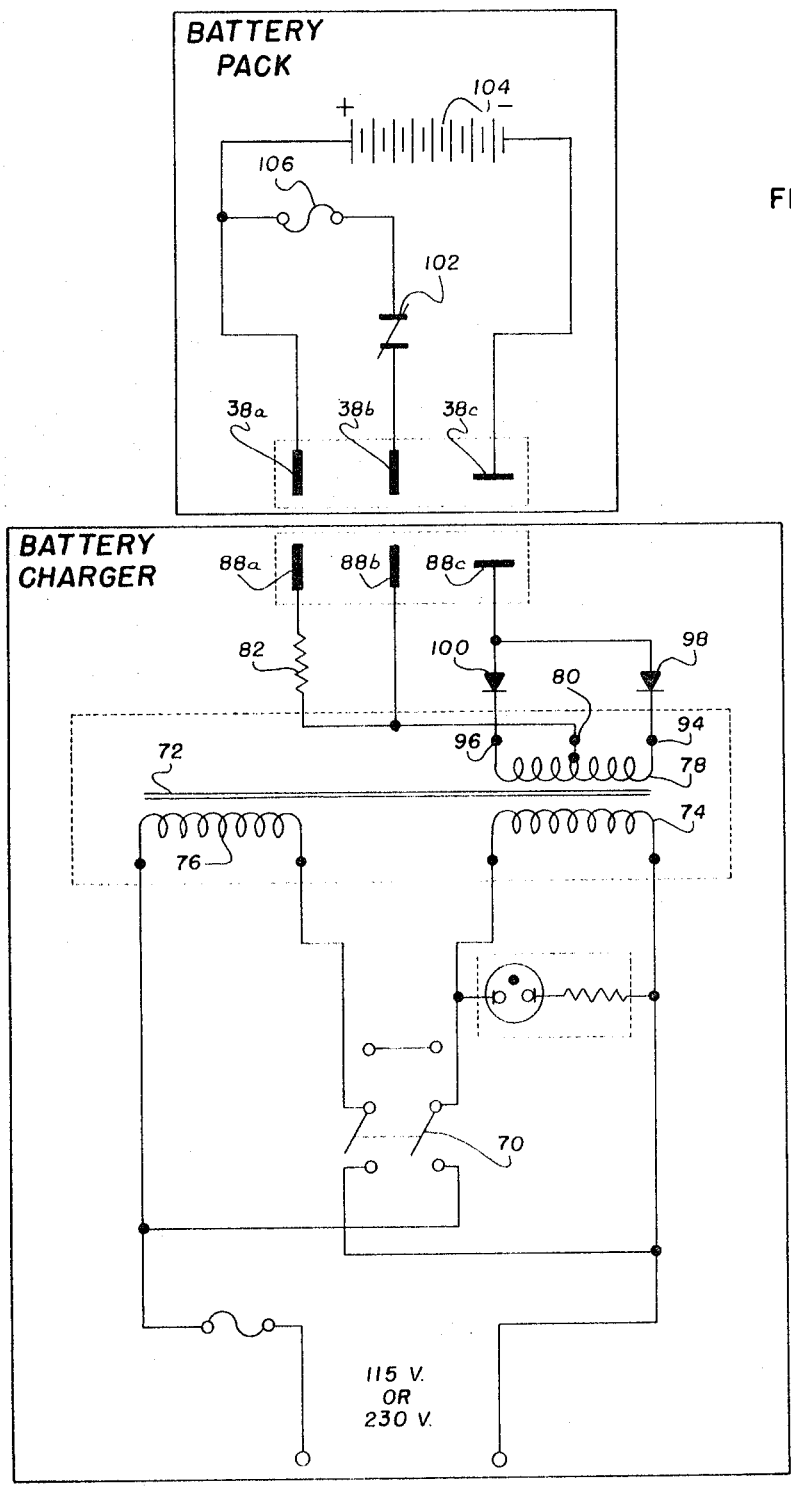
FIG. 5 is a schematic wiring diagram of the charging circuit.

Referring now to the schematic as shown in FIG. 5, switch 70 is placed in the proper position for the power source which may be either 115 volts AC or 230 volts AC. Transformer 72 has two primary windings 74 and 76 which are either connected in series or parallel depending upon the position of switch 70. Secondary winding 78 of transformer 72 is connected through center tap 80 directly to terminal 88b and through a current limiting resistor 82 to terminal 88a on female socket 46. Ends 94 and 96 of secondary winding 78 are respectively connected through diodes 98 and 100 to terminal 88c on female socket 46 to provide full wave rectification of the secondary voltages. Electrical terminals 88a, 88b, and 88c are respectively positioned in openings 48a, 48b, and 48c in female socket 46 described previously. Blade 38c on the male plug is connected to the negative pole of battery 104 within battery pack 2. Blade 38a is connected to the positive pole of battery 104.

Battery 104, as seen in FIGS. 3 and 5 comprises, in the preferred embodiment, nine cells connected in series. The charging circuit via terminal 88a to battery 104 includes current limiting resistor 82 and comprises the low rate charging circuit. A second, high charge rate, circuit leads from terminal 88b through a pressure switch 102 and a thermal fuse 106 to the positive terminal of battery 104. This second circuit therefore bypasses current limiting resistor 82 and provides a higher charge rate. However, when the high charging rate results in a build up of gas pressure within battery cell 104a in which pressure switch 102 is mounted, pressure switch 102 opens thus disconnecting the high charge rate circuit. Charging then continues through the low charge rate circuit until charging is complete or until the pressure in cell 104a is reduced sufficiently to close pressure switch 102 reactivating the high charge rate circuit.

Battery charger case 12 is also provided with ventilation means to dissipate the heat internally generated during charging. The ventilation means comprise vent openings 120 provided in the sidewall of case 12 between ribs 122. An air space is also provided between metal base 14 and case 12 as indicated at 130. This spacing is provided to allow air to circulate under metal base 14 (which, as shown in FIG. 2, is preferably raised by rubber feet or grommets 128) and up into the charger and then pass out through vent openings 120.

The charging system of the invention thus provides a novel combination of a multicell battery pack and a battery charger having a plurality of means to prevent improper electrical and mechanical interconnection between the pack and the charger. The pack and the charger each contain means which when coupled together provide two charging rates. The charger is also provided with cooling means to dissipate internal heat generated during charging.

What I claim as new and desire to secure by Letters Patent of the United States is:

1. A system for charging a rechargeable battery, comprising battery charger means including a first casing having means therein for dissipating heat therefrom, rechargeable battery means including a second casing, means within said casings providing a high current charge rate and a low current charge rate, and means for interconnecting said battery charger means with said rechargeable battery means, said interconnecting means comprising:

a. electrical coupling means including a male plug member having a plurality of metal prongs and a female socket member, one of said members being carried by said charger means and the other of said members being carried by said rechargeable battery means, said male plug member being recessed into one of said casings an amount equal to or slightly in excess of the length of said prongs and said female socket being sufficiently raised on the other of said casings to be received in said recess, said recess conforming geometrically to the outer configuration of said raised female socket;

b. lug means on one of said casings and matching recess means in the other of said casings, said lug means and said recess means being spaced parallel and offset to said plug and socket members so that said lug means is slideably received in said recess means when said plug on one of said casings is oriented properly to said socket on the other of said casings, and c. mating means on said casings including lateral projections on one of said casings slideably received in matching recesses in the other of said casings, said lateral projections being normal to said lug means, said mating means cooperating to guide said battery means into electrically coupled relationship with said charger means and to maintain said battery means and said charger means in said relationship.

2. A system for charging a rechargeable battery, comprising battery charger means including a first casing, rechargeable battery means including a second casing, and a plurality of means for interconnecting said battery charger means with said rechargeable battery means, said interconnecting means comprising:

A. electrical coupling means including a male plug member having at least three metal prongs, and a female socket member having a corresponding number of openings therein in a predetermined pattern to interconnect a plurality of circuits from the charger to the battery, including at least a high charge rate circuit and a low charge rate circuit, one of said members being carried by said charger means and the other of said members being carried by said rechargeable battery means, said male plug member being recessed into one of said casings an amount substantially equal to the length of said prongs and said female socket being sufficiently raised on the other of said casings to be received in said recess, said recess conforming geometrically to the outer configuration of said raised female socket;

B. a pair of lugs on one of said casings and matching recess means in the other of said casings, said lugs and said recess means being spaced parallel and offset to said plug and socket members so that said lugs are slideably received in said recess means only when said plug on one of said casings is oriented properly to said socket on the other of said casings; and C. mating means on said casings including a pair of parallel, spaced apart, ribs on one of said casings slideably received in matching grooves in the other of said casings, said ribs and grooves being normal to said lug means, and offset from a plane parallel to said ribs and grooves passing centrally through said plug member, said mating means cooperating to guide said battery means into electrically coupled relationship with said charger means and to maintain said battery means and said charger means in said relationship.

3. The charging system of claim 7 further comprising current limiting means within one of said casings to limit the flow of charge current through the low charge rate circuit, and switch means in the other of said casings responsive to a pressure buildup in one of said cells to disconnect said high charge rate circuit.

4. The system of claim 2 wherein said charger contains means for dissipating heat generated during charging including vent means to provide air flow from beneath the charger and through openings in said casing.

* * * * *